United States Patent
Atsushi et al.

(10) Patent No.: US 10,899,329 B2
(45) Date of Patent: Jan. 26, 2021

(54) HYDRAULIC BRAKE SYSTEM, BICYCLE, AND METHOD FOR CONTROLLING HYDRAULIC BRAKE SYSTEM

(71) Applicant: Robert Bosch GmbH, Stuttgart (DE)

(72) Inventors: Hiroaki Atsushi, Kanagawa (JP); Shigeki Ikeda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/063,314

(22) PCT Filed: Nov. 8, 2016

(86) PCT No.: PCT/IB2016/056703
§ 371 (c)(1),
(2) Date: Jun. 18, 2018

(87) PCT Pub. No.: WO2017/103703
PCT Pub. Date: Jun. 22, 2017

(65) Prior Publication Data
US 2018/0362004 A1 Dec. 20, 2018

(30) Foreign Application Priority Data
Dec. 18, 2015 (JP) .................................. 2015-247663

(51) Int. Cl.
*B60T 8/32* (2006.01)
*B60T 8/17* (2006.01)
(Continued)

(52) U.S. Cl.
CPC .......... *B60T 8/3225* (2013.01); *B60T 8/1706* (2013.01); *B60T 8/42* (2013.01); *B60T 13/662* (2013.01);
(Continued)

(58) Field of Classification Search
CPC .......... B62L 3/02; B62L 3/023; B60T 8/1706; B60T 8/3225; B62M 6/45; B62M 6/65
See application file for complete search history.

(56) References Cited

U.S. PATENT DOCUMENTS 3,921,741 A * 11/1975 Garfinkle ................. B62M 6/45
180/206.2
6,874,592 B2 * 4/2005 Yokotani .................. B62J 99/00
180/206.2
(Continued)

FOREIGN PATENT DOCUMENTS

DE 10158382 6/2003
DE 10250645 7/2003
(Continued)

OTHER PUBLICATIONS

EPO translation of DE 10158382 A1, Jun. 2003. (Year: 2003).*
(Continued)

*Primary Examiner* — Thomas J Williams
(74) *Attorney, Agent, or Firm* — Michael Best & Friedrich LLP (57) ABSTRACT

The invention obtains a hydraulic brake system, installability of which in a bicycle is improved. The invention also obtains a bicycle that includes such a hydraulic brake system. The invention further obtains a method for controlling such a hydraulic brake system.

A hydraulic brake system 100 includes a hydraulic pressure controller 100 and a power supply unit 150 of the hydraulic pressure controller 100, the hydraulic pressure controller 100 including: a base section that is formed with a channel, through which a brake fluid flows, therein; a valve that is attached to the base section and opens and closes the channel; and a control section that governs an opening/closing operation of the valve and controlling hydraulic pressure of the brake fluid that is supplied to a wheel braking (Continued)

section of the bicycle. The power supply unit 150 includes a generator 151 that generates electric power by traveling of a bicycle 200.

11 Claims, 6 Drawing Sheets

(51) Int. Cl.
    *B62L 3/02*     (2006.01)
    *B60T 8/42*     (2006.01)
    *B60T 13/66*     (2006.01)
    *B62M 6/50*     (2010.01)

(52) U.S. Cl.
    CPC ............... *B62L 3/023* (2013.01); *B62M 6/50* (2013.01); *B60L 2200/12* (2013.01); *B60L 2240/12* (2013.01)

(56) References Cited

U.S. PATENT DOCUMENTS

| | | | | |
|---|---|---|---|---|
| 2012/0239235 A1* | 9/2012 | Voigtlaender | ............ | B60L 7/18 |
| | | | | 701/22 |
| 2015/0329094 A1* | 11/2015 | Weh | ........................ | B62L 3/023 |
| | | | | 303/167 |
| 2015/0344009 A1* | 12/2015 | Hagspiel | ................. | B62L 3/023 |
| | | | | 303/119.1 |
| 2017/0080911 A1* | 3/2017 | Atsushi | ..................... | B60T 8/34 |

FOREIGN PATENT DOCUMENTS

| | | | | |
|---|---|---|---|---|
| DE | 102010038525 A1 * | 2/2012 | ................ | B60T 7/12 |
| DE | 202014008870 | 12/2014 | | |
| DE | 102014005527 | 10/2015 | | |
| EP | 1391325 | 2/2004 | | |
| JP | 2010035376 | 2/2010 | | |
| JP | 2015074345 | 4/2015 | | |
| JP | 2015523259 A | 8/2015 | | |
| WO | 2014016124 | 1/2014 | | |
| WO | 2014108234 | 7/2014 | | |
| WO | 2014108235 | 7/2014 | | |

OTHER PUBLICATIONS

International Search Report for Application No. PCT/IB2016/056703 dated Jan. 31, 2017 (English Translation, 3 pages).

\* cited by examiner

HYDRAULIC BRAKE SYSTEM, BICYCLE, AND METHOD FOR CONTROLLING HYDRAULIC BRAKE SYSTEM

BACKGROUND OF THE INVENTION

The invention relates to a hydraulic brake system that includes: a hydraulic pressure controller for controlling hydraulic pressure of a brake fluid that is supplied to a wheel braking section of a bicycle; and a power supply unit thereof, a bicycle that includes the hydraulic brake system, and a method for controlling the hydraulic brake system.

As a conventional brake system of a bicycle, for example, a brake system that includes: a wheel braking section for braking rotation of a wheel; wire for changing a braking force generated in the wheel braking section when tension corresponding to an operation by a user is generated; and a tension controller for controlling the tension generated in the wire and thereby controlling the braking force generated in the wheel braking section is available (for example, see PTL 1).

CITATION LIST

Patent Literature

[PTL 1] WO 2014/016124

SUMMARY OF INVENTION

Even in the cases where a hydraulic brake system, that is, a brake system for generating hydraulic pressure that corresponds to the operation by the user in a brake fluid filled in a brake circuit and thereby changing the braking force generated in the wheel braking section is adopted as a break system, where braking performance of the bicycle is thus improved, and the like, similar to the above-described brake system, a controller that plays a similar role to the tension controller, that is, a hydraulic pressure controller for controlling the hydraulic pressure generated in the brake fluid and thereby controlling the braking force generated in the wheel braking section possibly becomes necessary.

For example, in the case where anti-lock brake control is executed in such a controller to repeat an increase and a reduction in pressure of the brake fluid in a short time period, and the like, a method for switching a channel by an opening/closing operation of a valve is preferably adopted in order to improve responsiveness of control of the hydraulic pressure of the brake fluid. However, because a large amount of electric power is consumed for the opening/closing operation of the valve, a power supply unit of the hydraulic pressure controller needs to be enlarged. In addition, weight of the bicycle is limited to secure operability, and an arrangement space thereof is also limited. Thus, there is a tendency that the enlargement of the power supply unit of the hydraulic pressure controller is especially not preferred.

In other words, the bicycle, on which an influence of the enlargement of the power supply unit is particularly significant, has such a problem that it is difficult to adopt the hydraulic brake system in the method for switching the channel by the opening/closing operation of the valve.

The invention has been made with the above-described problem as the background and therefore obtains a hydraulic brake system, installability of which in a bicycle is improved. The invention also obtains a bicycle that includes such a hydraulic brake system.

A hydraulic brake system according to the invention includes a hydraulic pressure controller and a power supply unit of the hydraulic pressure controller. The hydraulic pressure controller includes: a base section that is formed with a channel, through which a brake fluid flows, therein; a valve that is attached to the base section and opens and closes the channel; and a control section that governs an opening/closing operation of the valve, and controls hydraulic pressure of the brake fluid that is supplied to a wheel braking section of a bicycle. The power supply unit includes a generator that generates electric power by traveling of the bicycle.

In addition, a bicycle according to the invention includes the hydraulic brake system as described above.

A method for controlling a hydraulic brake system according to the invention is a method for controlling a hydraulic brake system that includes a hydraulic pressure controller and a power supply unit of the hydraulic pressure controller, the hydraulic pressure controller including: a base section that is formed with a channel, through which a brake fluid flows, therein; and a valve that is attached to the base section and opens and closes the channel and controlling hydraulic pressure of the brake fluid that is supplied to a wheel braking section of a bicycle, and the power supply unit including a generator that generates electric power by traveling of the bicycle. The method includes: a step of governing an opening/closing operation of the valve; a step of determining an operation state of the wheel braking section of the bicycle by a user; and a step of controlling a power generating operation of the generator in accordance with the operation state.

In the hydraulic brake system, the bicycle, and the method for controlling the hydraulic brake system according to the invention, at least some of the electric power that is consumed by the hydraulic pressure controller is covered by the generator for generating the electric power by traveling of the bicycle. Accordingly, even in the case where the hydraulic brake system in a method for switching the channel by the opening/closing operation of the valve is adopted for the bicycle, on which an influence of enlargement of the power supply unit is particularly significant, installability of the hydraulic brake system can be improved by downsizing the power supply unit of the hydraulic pressure controller.

DETAILED DESCRIPTION

A description will hereinafter be made on a hydraulic brake system, a bicycle, and a method for controlling the hydraulic brake system according to the invention by using the drawings.

Note that the bicycle hereinafter means all types of vehicles including a pedal, to which a pedaling force of a user is applied. In addition, a normal bicycle means a bicycle that obtains a propulsion force only by the pedaling force of the user. Furthermore, an electric-assisted bicycle means a bicycle that has a function of assisting the pedaling force of the user with a motor. Moreover, an electric bicycle means a bicycle that has a function of obtaining the propulsion force only by the motor.

Note that each of a configuration, an operation, and the like, which will be described below, is merely one example, and the hydraulic brake system and the bicycle according to the invention are not limited to a case with such a configuration, such an operation, and the like. For example, a description will hereinafter be made on a case where a hydraulic pressure controller executes anti-lock brake control. However, the hydraulic pressure controller may execute control other than the anti-lock brake control.

The same or similar members or portions will be denoted by the same reference sign in each of the drawings. In addition, a detailed structure will be depicted in an appropriately simplified manner or will not be depicted. Furthermore, an overlapping description will appropriately be simplified or will not be made.

First Embodiment

A description will hereinafter be made on a hydraulic brake system according to a first embodiment.
<Mode of Application of the Hydraulic Brake System to a Bicycle>

A description will be made on a mode of application of the hydraulic brake system according to the first embodiment to a bicycle.

Figure 1:
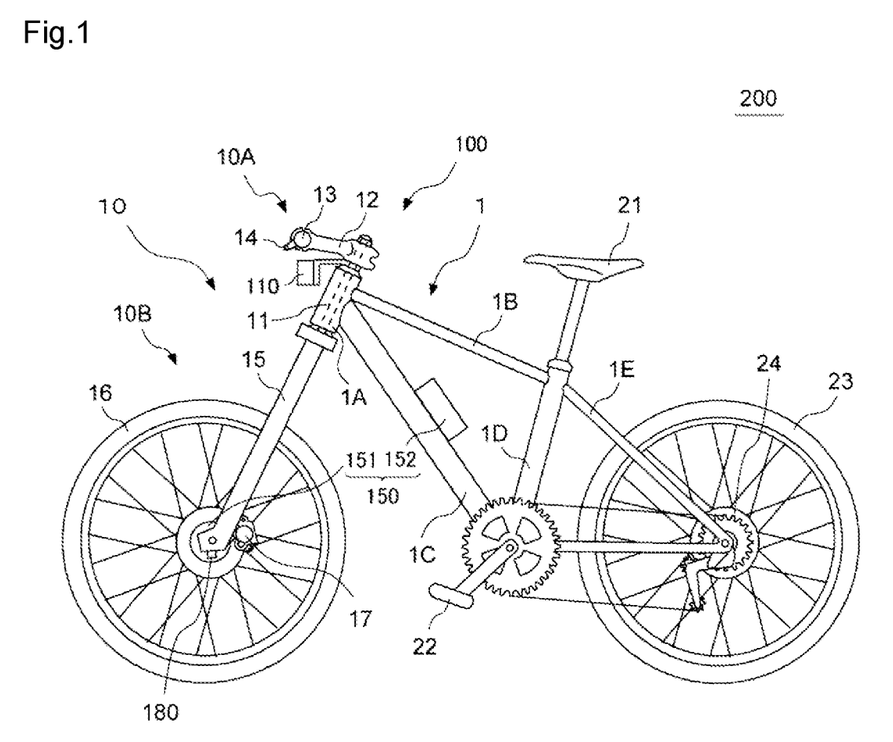
FIG. 1 is a view of schematic configurations of a hydraulic brake system according to a first embodiment of the invention and a bicycle, to which the hydraulic brake system is applied.

FIG. 1 is a view of schematic configurations of the hydraulic brake system according to the first embodiment of the invention and the bicycle, to which the hydraulic brake system is applied. Note that FIG. 1 depicts a case where a bicycle 200 is the normal bicycle; however, the bicycle 200 may be another bicycle such as the electric-assisted bicycle or the electric bicycle. In addition, FIG. 1 depicts a case where the bicycle 200 is a two-wheeled vehicle; however, the bicycle 200 may be another bicycle such as a tricycle.

As depicted in FIG. 1, the bicycle 200 includes a frame 1, a turning section 10, a saddle 21, a pedal 22, a rear wheel 23, and a rear-wheel braking section 24. The rear wheel 23 corresponds to a "wheel" in the invention. The rear-wheel braking section 24 corresponds to a "wheel braking section" in the invention.

The frame 1 includes: a head tube 1A that axially supports a steering column 11 of the turning section 10; a top tube 1B and a down tube 1C that are coupled to the head tube 1A; a seat tube 1D that is coupled to the top tube 1B and the down tube 1C and holds the saddle 21; and a stay 1E that is coupled to upper and lower ends of the seat tube 1D and to which the rear wheel 23 and the rear-wheel braking section 24 are attached.

The turning section 10 includes: an upper turning section 10A that turns on an upper side of the head tube 1A; and a lower turning section 10B that turns on a lower side of the head tube 1A.

The upper turning section 10A includes: a portion of the steering column 11 that is axially supported by the head tube 1A, the portion being projected to the upper side of the head tube 1A; and members held thereby. In other words, the upper turning section 10A includes: a handle stem 12 that is held by the steering column 11; a handlebar 13 that is held by the handle stem 12; and a braking operation section 14 that is attached to the handlebar 13.

The lower turning section 10B includes: a portion of the steering column 11 that is axially supported by the head tube 1A, the portion being projected below the head tube 1A; and members held thereby. In other words, the lower turning section 10B includes: a fork 15 that is coupled to the steering column 11; and a front wheel 16 and a front-wheel braking section 17 that are attached to the fork 15. The front wheel 16 corresponds to the "wheel" in the invention. The front-wheel braking section 17 corresponds to the "wheel braking section" in the invention.

The braking operation section 14 includes: a mechanism that is used as an operation section of the front-wheel braking section 17; and a mechanism that is used as an operation section of the rear-wheel braking section 24. For example, the mechanism that is used as the operation section of the front-wheel braking section 17 is arranged on a right end side of the handlebar 13, and the mechanism that is used as the operation section of the rear-wheel braking section 24 is arranged on a left end side of the handlebar 13.

A hydraulic pressure controller 110 that controls hydraulic pressure of a brake fluid supplied to the front-wheel braking section 17 is coupled to the upper turning section 10A of the turning section 10 in the bicycle 200. The hydraulic pressure controller 110 may control the hydraulic pressure of the brake fluid that is supplied to the front-wheel braking section 17 and hydraulic pressure of a brake fluid that is supplied to the rear-wheel braking section 24. Alternatively, the rear-wheel braking section 24 may be a braking section of such a type that the brake fluid is not supplied thereto (for example, a braking section of a type that causes wire to generate tension and thereby changes a braking force, or the like).

A power supply unit 150 functions as a power supply of the hydraulic pressure controller 110. The power supply unit 150 includes: a generator 151 that generates electric power by traveling of the bicycle 200; and a battery 152. The generator 151 is a hub dynamo that is attached to the front wheel 16, and generates the electric power by rotation of the front wheel 16. The battery 152 is attached to the down tube 1C of the frame 1 of the bicycle 200. Note that the generator 151 (the hub dynamo) may be a hub dynamo that is attached to the rear wheel 23, and may generate the electric power by rotation of the rear wheel 23. In addition, the power supply unit 150 may function as a power supply of equipment (such as a headlamp) other than the hydraulic pressure controller 110 as well as of the hydraulic pressure controller 110.

The fork 15 of the bicycle 200 is provided with a rotational speed sensor 180 for detecting a rotational speed of the front wheel 16.

In other words, a hydraulic brake system 100 that includes the braking operation section 14, the front-wheel braking section 17, the rear-wheel braking section 24, the hydraulic pressure controller 110, the power supply unit 150, and the rotational speed sensor 180 is applied to the bicycle 200, and the hydraulic pressure of the brake fluid thereof is controlled by the hydraulic pressure controller 110.

<Configuration of the Hydraulic Brake System>

A description will be made on a configuration of the hydraulic brake system according to the first embodiment.

Figure 2:
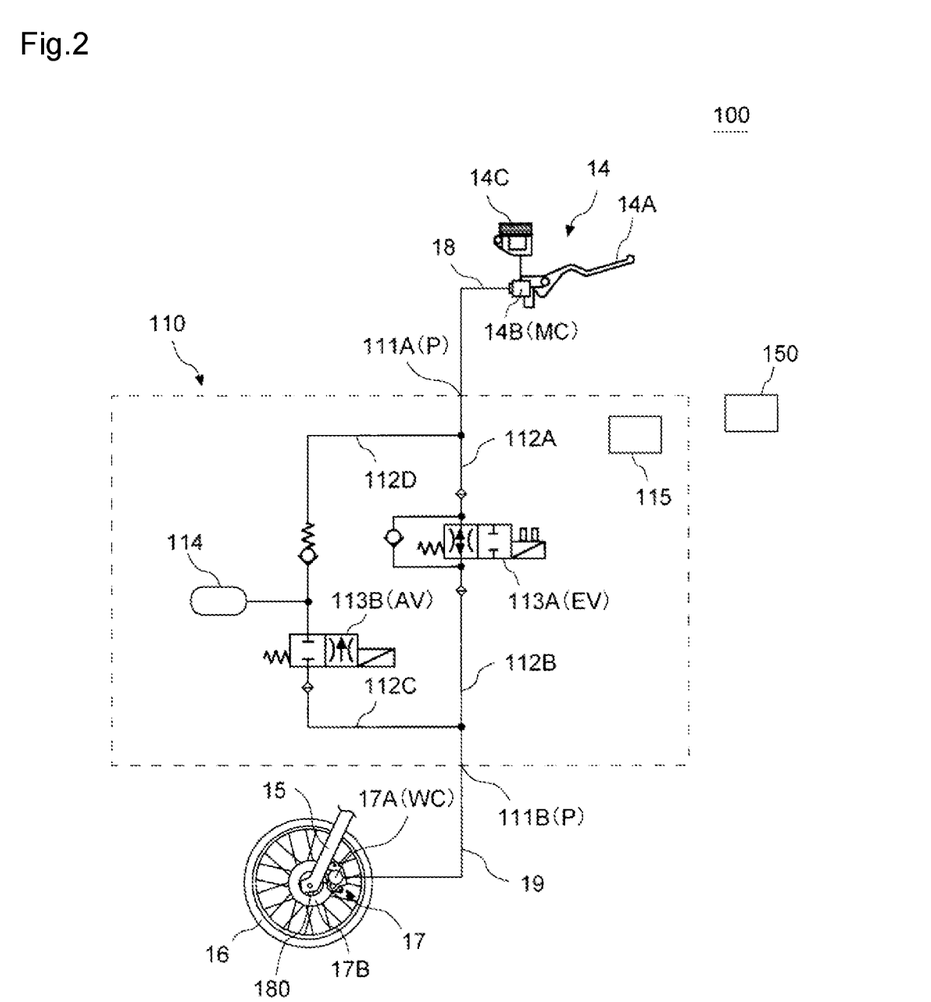
FIG. 2 is a view of the schematic configuration of the hydraulic brake system according to the first embodiment of the invention.

FIG. 2 is a view of the schematic configuration of the hydraulic brake system according to the first embodiment of the invention.

As depicted in FIG. 2, the hydraulic brake system 100 generates the braking force at least on the front wheel 16 of the bicycle 200. In particular, the hydraulic brake system 100 is preferably of a pump-less type.

The hydraulic pressure controller 110 includes a port 111A and a port 111B that are formed in a base section 121, which will be described below. The port 111A and the port 111B communicate with each other by partial channels 112A, 112B formed in the base section 121, which will be described below. In addition, an intermediate section of the partial channel 112B communicates with a partial channel 112C formed in the base section 121, which will be described below, and an intermediate section of the partial channel 112A communicates with a partial channel 112D formed in the base section 121, which will be described below. Each of the partial channels 112A, 112B, 112C, 112D corresponds to part of a "channel" in the invention.

The braking operation section 14 is connected to the port 111A via a brake fluid pipe 18. The braking operation section 14 has a brake lever 14A, a master cylinder 14B, and a reservoir 14C. The master cylinder 14B includes a piston section (not depicted) that moves in an interlocking manner with an operation of the brake lever 14A by the user, and is connected to an inlet side of the partial channel 112A via the brake fluid pipe 18 and the port 111A. Movement of the piston causes an increase or a reduction in the hydraulic pressure of the brake fluid in the partial channel 112A. In addition, the brake fluid of the master cylinder 14B is stored in the reservoir 14C.

The front-wheel braking section 17 is connected to the port 111B via a brake fluid pipe 19. The front-wheel braking section 17 has a wheel cylinder 17A and a brake disc 17B. The wheel cylinder 17A is held by the fork 15. The wheel cylinder 17A includes a piston section (not depicted) that moves in an interlocking manner with the hydraulic pressure in the brake fluid pipe 19, and is connected to an outlet side of the partial channel 112B via the brake fluid pipe 19 and the port 111B. The brake disc 17B is attached to the front wheel 16 and rotates with the front wheel 16. The front wheel 16 is braked when a brake pad (not depicted) is pressed against the brake disc 17B by movement of the piston section. Note that the front-wheel braking section 17 may not have the brake disc 17B.

In addition, the hydraulic pressure controller 110 includes an inlet valve 113A and an outlet valve 113B. The inlet valve 113A is provided between an outlet side of the partial channel 112A and an inlet side of the partial channel 112B and opens and closes between the partial channel 112A and the partial channel 112B. The outlet valve 113B is provided between an outlet side of the partial channel 112C and an inlet side of the partial channel 112D and opens and closes between the partial channel 112C and the partial channel 112D. The hydraulic pressure of the brake fluid is controlled by opening/closing operations of the inlet valve 113A and the outlet valve 113B. Each of the inlet valve 113A and the outlet valve 113B corresponds to a "valve" of the invention and opens and closes the "channel" of the invention.

The inlet valve 113A is, for example, an electromagnetic valve that is opened when not being energized, and allows a bidirectional flow of the brake fluid when not being energized. When the inlet valve 113A is energized, the inlet valve 113A is brought into a closed state by a solenoid and thereby blocks the flow of the brake fluid.

The outlet valve 113B is, for example, an electromagnetic valve that is closed when not being energized, and blocks the flow of the brake fluid when not being energized. When the outlet valve 113B is energized, the outlet valve 113B is brought into an opened state by a solenoid and thereby allows the flow of the brake fluid.

Furthermore, the hydraulic pressure controller 110 includes an accumulator 114. The accumulator 14 is connected to an intermediate section of the partial channel 112D, and the brake fluid that passes through the outlet valve 113B is stored therein.

Moreover, the hydraulic pressure controller 110 includes a control section 115 (an ECU). Note that the control section 115 may integrally be disposed with members other than the control section 115 of the hydraulic pressure controller 110 or may separately be disposed therefrom in the bicycle 200. In addition, each section of the control section 115 may separately be disposed. A part or a whole of the control section 115 may be constructed of a microcomputer, a microprocessor unit, or the like, for example, may be constructed of a member in which firmware and the like can be updated, or may be a program module or the like that is executed by a command from a CPU or the like.

The control section 115 controls the hydraulic pressure of the brake fluid, that is, the braking force of the front wheel 16 by controlling the opening/closing operations of the inlet valve 113A and the outlet valve 113B in the hydraulic pressure controller 110. In addition, the control section 115 receives a signal of the rotational speed sensor 180.

For example, in the case where locking or possible locking of the front wheel 16 is detected by the rotational speed sensor 180 when the bicycle 200 is braked by the operation of the brake lever 14A by the user, the control section 115 initiates anti-lock brake control.

Once initiating the anti-lock brake control, the control section 115 brings the inlet valve 113A into an energized state for closing and blocks a supply of the brake fluid to the wheel cylinder 17A, so as to stop the increase in the hydraulic pressure of the brake fluid in the wheel cylinder 17A. Meanwhile, the control section 115 brings the outlet valve 113B into an energized state for opening and allows the flow of the brake fluid from the wheel cylinder 17A to the accumulator 114, so as to reduce the hydraulic pressure of the brake fluid in the wheel cylinder 17A. In this way, locking of the front wheel 16 is canceled or avoided. When determining that the hydraulic pressure of the brake fluid in the wheel cylinder 17A is reduced to a specified value, the control section 115 brings the outlet valve 113B into an unenergized state for closing and brings the inlet valve 113A into an unenergized state for opening for a short time period, so as to increase the hydraulic pressure of the brake fluid in the wheel cylinder 17A. The control section 115 may increase/reduce the hydraulic pressure of the wheel cylinder 17A only once or may do so for plural times.

When the anti-lock brake control is terminated and the brake lever 14A returns, the inside of the master cylinder 14B is brought into an atmospheric pressure state, and the brake fluid in the wheel cylinder 17A returns. In addition, due to generation of this atmospheric pressure state, the brake fluid in the accumulator 114 returns to the partial channel 112A.

<Configuration of the Hydraulic Pressure Controller>

A description will be made on a configuration of the hydraulic pressure controller in the hydraulic brake system according to the first embodiment.

Figure 3:
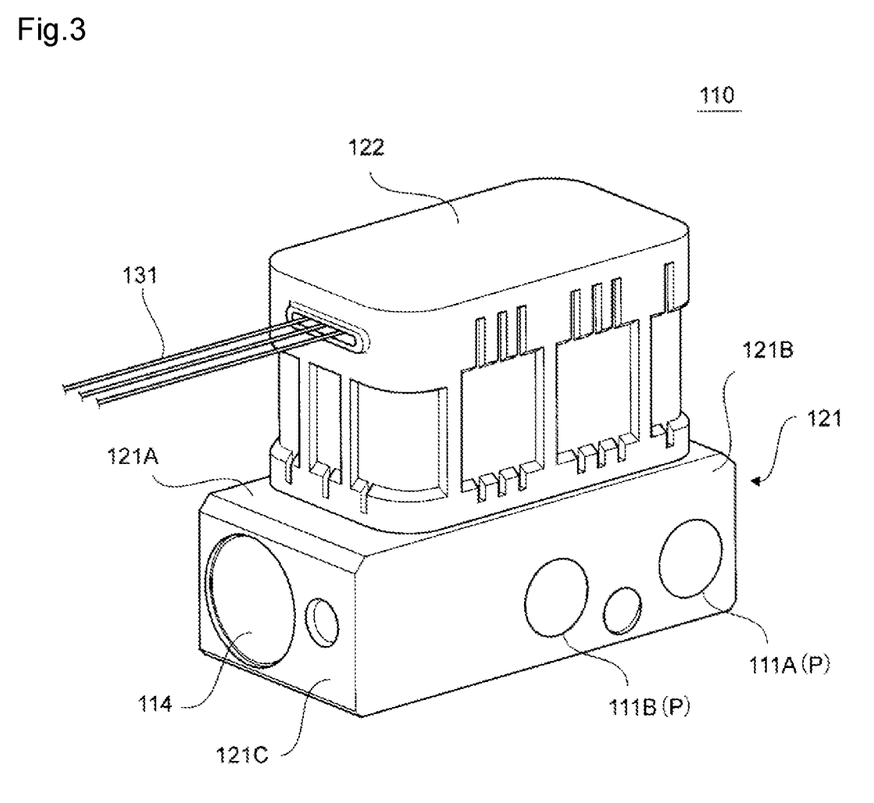
FIG. 3 is a perspective view of a configuration of a hydraulic pressure controller in the hydraulic brake system according to the first embodiment of the invention.
Figure 4:
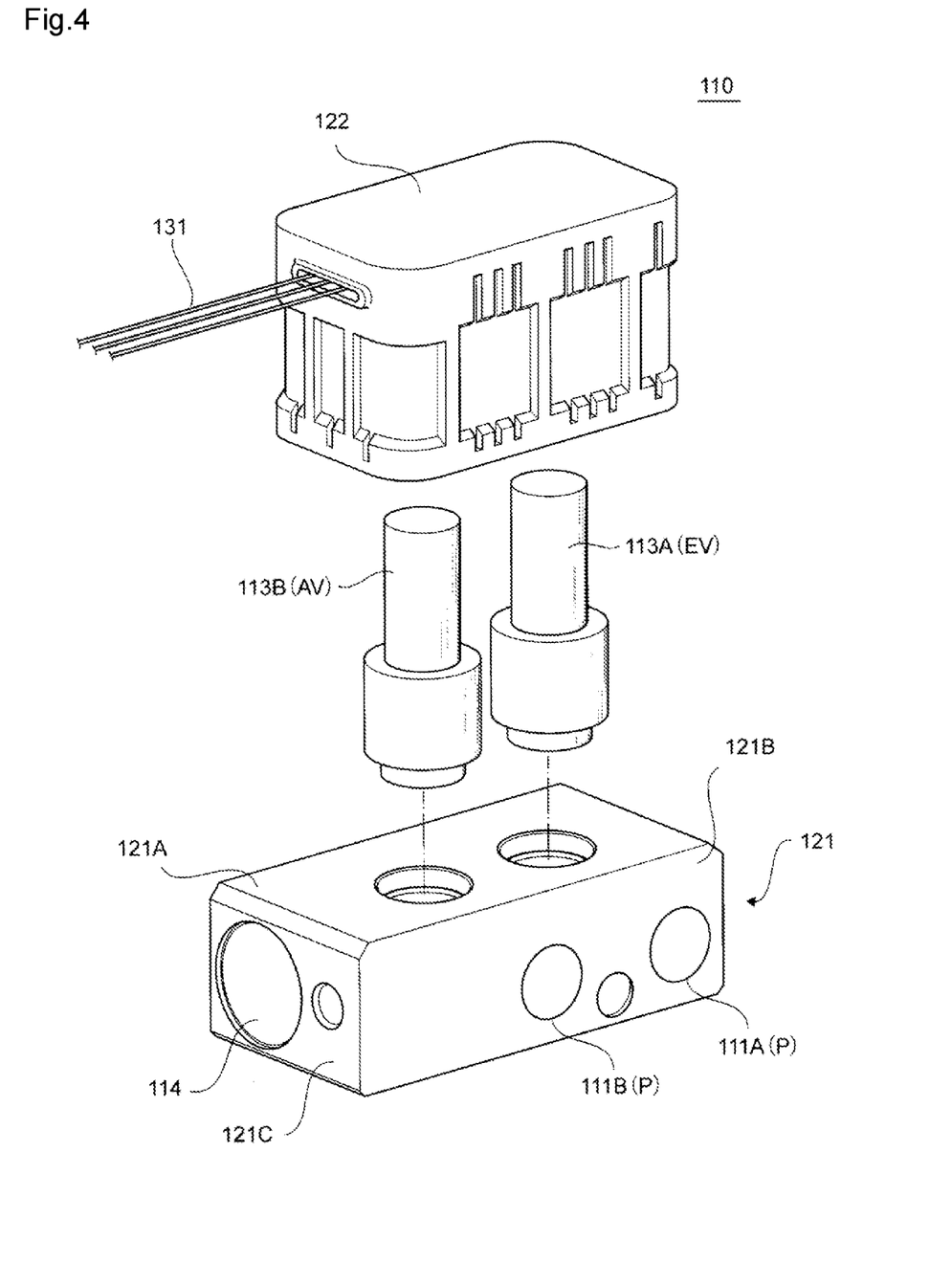
FIG. 4 is an exploded perspective view of the configuration of the hydraulic pressure controller in the hydraulic brake system according to the first embodiment of the invention.

FIG. 3 is a perspective view of the configuration of the hydraulic pressure controller in the hydraulic brake system according to the first embodiment of the invention. FIG. 4 is an exploded perspective view of the configuration of the hydraulic pressure controller in the hydraulic brake system according to the first embodiment of the invention.

As depicted in FIG. 3 and FIG. 4, the hydraulic pressure controller 110 includes: the base section 121 that is formed with the channels therein; and a valve case 122. The inlet valve 113A and the outlet valve 113B are attached to the base section 121 and are accommodated in the valve case 122.

The base section 121 is, for example, a member made of metal such as an aluminum alloy and has a first surface 121A, a second surface 121B, and a third surface 121C, two each of which intersect with each other at right angles. The inlet valve 113A and the outlet valve 113B are attached to the first surface 121A, the ports 111A, 111B are formed in the second surface 121B, and the accumulator 114 is attached to the third surface 121C. With such a configuration, size and weight of the hydraulic pressure controller 110 are reduced.

The valve case 122 is made of a resin, for example. A power supply line 131 from the power supply unit 150 penetrates an opening that is formed in the valve case 122 and is electrically connected to the control section 115 on the inside of the valve case 122. The inlet valve 113A and the outlet valve 113B are electrically connected to the control section 115.

<System Configuration of the Hydraulic Brake System>

A description will be made on a system configuration of the hydraulic brake system according to the first embodiment.

Figure 5:
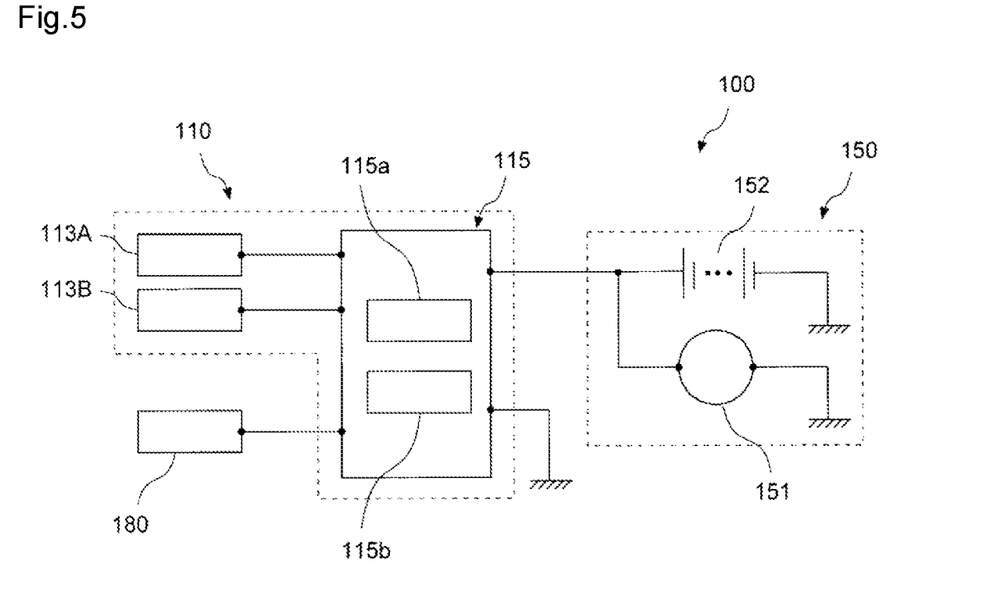
FIG. 5 is a view of a system configuration of the hydraulic brake system according to the first embodiment of the invention.

FIG. 5 is a view of the system configuration of the hydraulic brake system according to the first embodiment of the invention.

As depicted in FIG. 5, the inlet valve 113A and the outlet valve 113B are connected to the control section 115. A valve opening/closing operation control section 115a of the control section 115 controls opening/closing of the inlet valve 113A and the outlet valve 113B by switching the energized state and the unenergized state of the solenoids of those.

The rotational speed sensor 180 is connected to the control section 115. The control section 115 obtains the rotational speed of the front wheel 16 by using the detection signal of the rotational speed sensor 180. A locking state determination section 115b of the control section 115 determines from the rotational speed whether the front wheel 16 is locked or whether the front wheel 16 is possibly locked.

The power supply unit 150, which functions as the power supply of the control section 115 and the equipment connected to the control section 115, is connected to the control section 115. The generator 151 (the hub dynamo) is connected between the control section 115 and the battery 152. Accordingly, in the case where an amount of the electric power that is consumed by the control section 115 and the equipment connected to the control section 115 is small, the electric power that is generated by the generator 151 (the hub dynamo) is stored in the battery 152. Meanwhile, in the case where necessity of energizing the solenoids of the inlet valve 113A and the outlet valve 113B arises in the anti-lock brake control and the amount of the electric power that is consumed by the control section 115 and the equipment connected to the control section 115 is thereby increased, the electric power that is generated by the generator 151 (the hub dynamo) is supplied to the control section 115, and the electric power stored in the battery 152 is supplied thereto. Note that, in the case where the amount of the electric power that is generated by the generator 151 (the hub dynamo) is sufficiently large, the battery 152 may not be provided. In addition, in such a case, a voltage stabilizing circuit is preferably provided between the generator 151 (the hub dynamo) and the control section 115.

<Effects of the Hydraulic Brake System>

A description will be made on effects of the hydraulic brake system according to the first embodiment.

The hydraulic brake system 100 includes the hydraulic pressure controller 100 and the power supply unit 150 thereof. The hydraulic pressure controller 100 includes: the base section 121; the valves (the inlet valve 113A, the outlet valve 113B) that are attached to the base section 121 and open and close the channels (the partial channels 112A, 112B, 112C, 112D) formed therein; and the control section 115 that governs the opening/closing operations of the valves (the inlet valve 113A, the outlet valve 113B). The power supply unit 150 includes the generator 151 that generates the electric power by traveling of the bicycle 200. Accordingly, at least some of the electric power that is consumed by the hydraulic pressure controller 110 is covered by the generator 151 for generating the electric power by traveling of the bicycle 200. Thus, even in the case where the hydraulic brake system 100 in a method for switching the channels (the partial channels 112A, 112B, 112C, 112D) by the opening/closing operations of the valves (the inlet valve 113A, the outlet valve 113B) is adopted for the bicycle 200, on which an influence of enlargement of the power supply unit 150 is particularly significant, installability of the hydraulic brake system 100 in the bicycle 200 can be improved by downsizing the power supply unit 150 of the hydraulic pressure controller 110.

Preferably, the power supply unit 150 includes the battery 152 that stores the electric power generated by the generator 151. With such a configuration, necessity of increasing a power generation amount of the generator 151 for preparation of a time when the valves (the inlet valve 113A, the outlet valve 113B) are opened/closed is reduced. Thus, the installability of the hydraulic brake system 100 in the bicycle 200 can further be improved by downsizing the power unit 150 of the hydraulic pressure controller 110. In addition, a voltage that is supplied to the hydraulic pressure controller 110 is stabilized by the battery 152. Thus, the control of the hydraulic pressure of the brake fluid is stabilized.

Preferably, the generator 151 is the hub dynamo that generates the electric power by the rotation of the wheels (the front wheel 16, the rear wheel 23) of the bicycle 200. With such a configuration, an increase in cost of the hydraulic brake system 100, which is caused by covering the power generation amount, is suppressed.

Preferably, the control section 115 executes the anti-lock brake control for opening/closing the valves (the inlet valve 113A, the outlet valve 113B). Because the anti-lock brake control is executed to protect safety of the user, necessity of stably supplying the electric power of the hydraulic pressure controller 110, which executes the control, is especially high. In addition, in the anti-lock brake control for opening/closing the valves (the inlet valve 113A, the outlet valve 113B), the amount of the electric power that is consumed for the opening/closing operations of the valves (the inlet valve 113A, the outlet valve 113B) is large. Thus, the necessity is further increased. Therefore, effects obtained by adopting the above-described configuration are especially significant.

Second Embodiment

A description will hereinafter be made on a hydraulic brake system according to a second embodiment.

Note that a description that overlaps the description on the hydraulic brake system according to the first embodiment will appropriately be omitted.

<Mode of Application of the Hydraulic Brake System to a Bicycle>

A description will be made on a mode of application of the hydraulic brake system according to the second embodiment to a bicycle.

Figure 6:
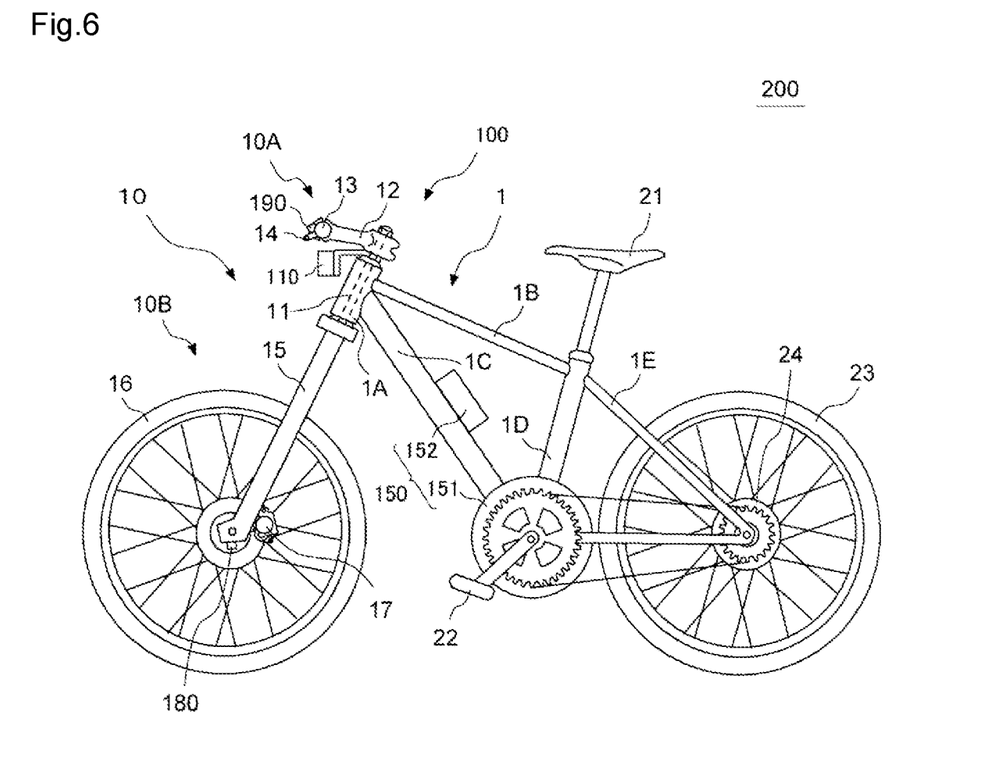
FIG. 6 is a view of schematic configurations of a hydraulic brake system according to a second embodiment of the invention and a bicycle, to which the hydraulic brake system is applied.

FIG. 6 is a view of schematic configurations of the hydraulic brake system according to the second embodiment of the invention and the bicycle, to which the hydraulic brake system is applied. Note that FIG. 6 depicts a case where the bicycle 200 is the electric-assisted bicycle; however, the bicycle 200 may be another bicycle such as the electric bicycle.

As depicted in FIG. 6, the generator 151 of the power supply unit 150 is a motor of a drive source of the rear wheel 23 and generates regenerative electric power when the rear wheel 23 is not driven. The battery 152 stores the regenerative electric power of the generator 151 (the motor) that is generated when the rear wheel 23 is not driven. When the generator 151 (the motor) is operated as the drive source of the rear wheel 23, the battery 152 may become a power supply thereof, or another battery may become the power supply thereof.

A brake lever angle sensor 190 that detects displacement (angular displacement) of the brake lever 14A is provided on the handlebar 13 of the bicycle 200.

<System Configuration and a Power Generating Operation Flow of the Hydraulic Brake System>

A description will be made on a system configuration and a power generating operation flow of the hydraulic brake system according to the second embodiment.

Figure 7:
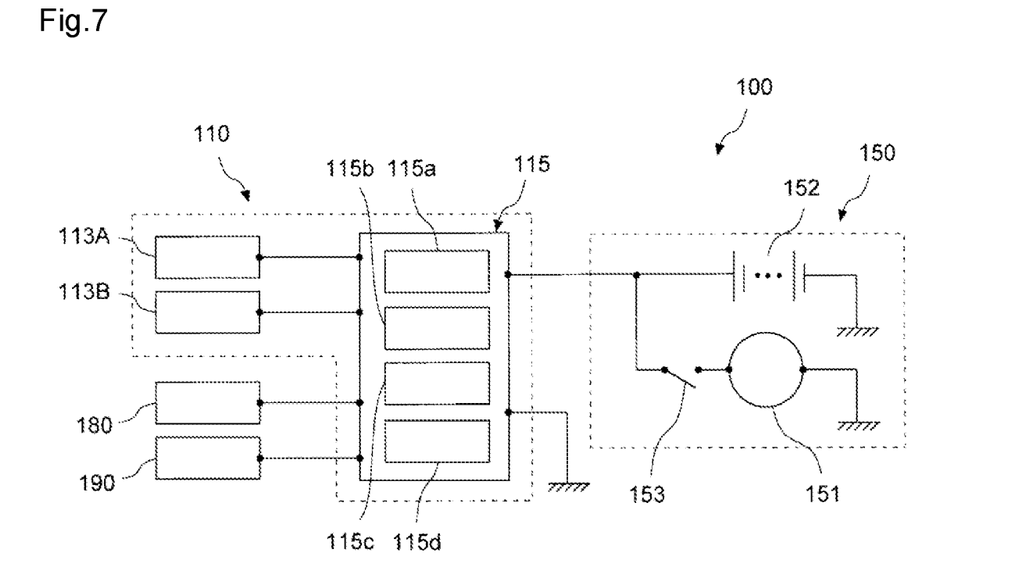
FIG. 7 is a view of a system configuration of the hydraulic brake system according to the second embodiment of the invention.
Figure 8:
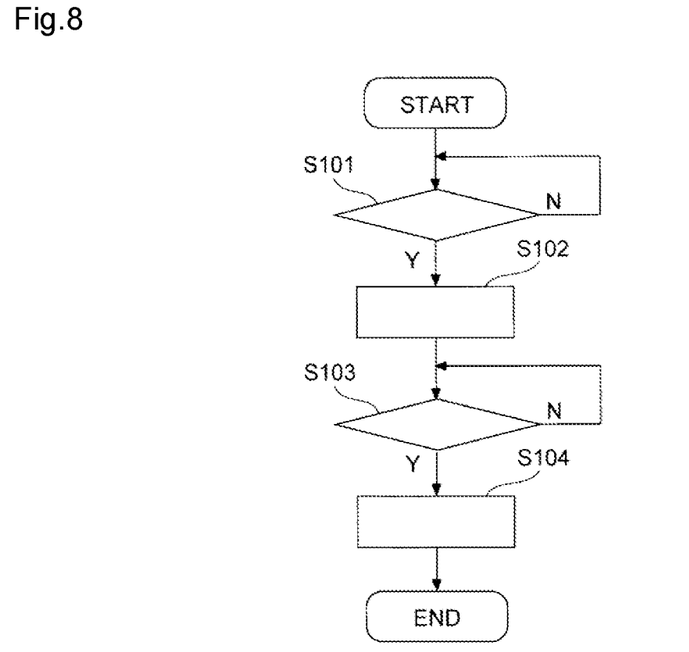
FIG. 8 is a chart of a power generating operation flow of the hydraulic brake system according to the second embodiment of the invention.

FIG. 7 is a view of the system configuration of the hydraulic brake system according to the second embodiment of the invention. FIG. 8 is a chart of the power generating operation flow of the hydraulic brake system according to the second embodiment of the invention.

As depicted in FIG. 7, the brake lever angle sensor 190 is connected to the control section 115. A braking operation state determination section 115c of the control section 115 uses a detection signal of the brake lever angle sensor 190 and determines whether the user operates the braking operation section 14.

A switch 153 is provided between the generator 151 (the motor) and a combination of the controller 151 and the battery 152. A power generating operation control section 115d of the control section 115 executes the following power generating operation flow in a state where the generator 151 (the motor) does not drive the rear wheel 23 and the braking operation section 14 is not operated by the user.

As depicted in FIG. 8, the braking operation state determination section 115c of the control section 115 determines whether the user operates the braking operation section 14 in S101. If the determination is positive, the process proceeds to S102. If the determination is negative, S101 is repeated.

In S102, the power generating operation control section 115d turns the switch 153 on, and initiates the power generation by the generator 151 (the motor). Then, the process proceeds to S103. In other words, the power generating operation control section 115d initiates the power generation by the generator 151 (the motor) at a time that is after the user operates the braking operation section 14 and before the front-wheel braking section 17 starts braking.

In S103, the braking operation state determination section 115c determines whether the user no longer operates the braking operation section 14. If the determination is positive, the process proceeds to S104. If the determination is negative, S103 is repeated.

In S104, the power generating operation control section 115d turns the switch 153 off, and terminates the power generation by the generator 151 (the motor). In other words, the power generating operation control section 115d does not terminate the power generation by the generator 151 (the motor) at a time when it is in a state where the user operates the braking operation section 14 and when the front-wheel braking section 17 starts braking.

<Effects of the Hydraulic Brake System>

A description will be made on effects of the hydraulic brake system according to the second embodiment.

Preferably, the generator 151 is the motor of the drive source of the wheel (the front wheel 16, the rear wheel 23) of the bicycle 200. With such a configuration, the increase in cost of the hydraulic brake system 100, which is caused by covering the power generation amount, is suppressed.

Preferably, the control section 115 controls the power generating operation of the generator 151 in accordance with an operation state of the braking operation section 14 of the bicycle 200 by the user. With such a configuration, both of coverage of the power generation amount and maintenance of running performance of the bicycle 200 can be achieved.

Preferably, the control section 115 initiates the power generation by the generator 151 in a state where the braking operation section 14 is operated and the wheel braking section (at least the front-wheel braking section 17) does not start braking. With such a configuration, the user is suppressed from having such a feeling that the pedal 22 is heavy due to the power generation by the generator 151. In addition, in the state where the braking operation section 14 is operated and the wheel braking sections (the front-wheel braking section 17, the rear-wheel braking section 24) do not start braking, that is, in a state where an angle of the brake lever 14A of the braking operation section 14 falls within an allowance range, the bicycle 200 can be braked by the power generation of the generator 151. Thus, braking performance of the bicycle 200 is improved.

Preferably, the control section 115 continues the power generation of the generator 151 when the wheel braking sections (the front-wheel braking section 17, the rear-wheel braking section 24) start braking. Accordingly, in the state where the braking operation section 14 is operated and after the wheel braking sections (the front-wheel braking section 17, the rear-wheel braking section 24) start braking, braking of the bicycle 200 can be assisted by the power generation of the generator 151. Thus, the braking performance of the bicycle 200 is improved.

The description has been made so far on the first embodiment and the second embodiment. However, the invention is not limited to the description of each of the embodiments of the invention, and all or a part of each of the embodiments may be combined. For example, both of the hub dynamo and the motor may be used as the generator 151. In addition, in the first embodiment, the generator 151 (the hub dynamo) may be controlled to perform the power generating operation as in the second embodiment.

REFERENCE SIGNS LIST

1: Frame
1A: Head tube
1B: Top tube
1C: Down tube
1D: Seat tube
1E: Stay
10: Turning section
10A: Upper turning section
10B: Lower turning section
11: Steering column
12: Handle stem
13: Handlebar
14: Braking operation section
14A: Brake lever
14B: Master cylinder
14C: Reservoir
15: Fork
16: Front wheel
17: Front-wheel braking section
17A: Wheel cylinder
17B: Brake disc
18, 19: Brake fluid pipe
21: Saddle
22: Pedal
23: Rear wheel
24: Rear-wheel braking section
100: Hydraulic brake system
110: Hydraulic pressure controller
111A, 111B: Port
112A, 112B, 112C, 112D: Partial channel
113A: Inlet valve
113B: Outlet valve
114: Accumulator
115: Control section
115a: Valve opening/closing operation control section
115b: Locking state determination section
115c: Braking operation state determination section
115d: Power generating operation control section
121: Base section
121A: First surface
121B: Second surface
121C: Third surface
122: Valve case
131: Power supply line
150: Power supply unit
151: Generator
152: Battery
153: Switch
180: Rotational speed sensor
190: Brake lever angle sensor
200: Bicycle

The invention claimed is:

1. A hydraulic brake system comprising:
a hydraulic pressure controller including: a base section that is formed with a channel, through which a brake fluid flows; a valve attached to the base section configured to open and close the channel; and a control section configured to govern an opening/closing operation of the valve and control hydraulic pressure of the brake fluid that is supplied to a wheel braking section of a bicycle; and
a power supply unit of the hydraulic pressure controller including a generator that generates electric power by traveling of the bicycle and a battery that stores the electric power generated by the generator, the generator being connected between the control section and the battery;
wherein an amount of electric power provided to the control section and the valve is increased in response to a detection of a locking of a wheel by providing electrical power to energize a solenoid of the control section (115) via a combination of both the generator and the battery.

2. The hydraulic brake system of claim 1, wherein the control section is configured to detect an operation state of the braking operation section of the bicycle by a user via a brake lever angle sensor.

3. The hydraulic brake system according to claim 1, wherein the generator is a hub dynamo that generates the electric power by rotation of a wheel of the bicycle.

4. The hydraulic brake system according to claim 1, wherein the generator is a motor of a drive source of a wheel of the bicycle.

5. The hydraulic brake system according to claim 1, wherein the control section controls a power generating operation of the generator in accordance with an operation state of the braking operation section of the bicycle by a user.

6. The hydraulic brake system according to claim 5, wherein the control section initiates power generation by the generator in a state where the braking operation section is operated and the wheel braking section does not start braking.

7. The hydraulic brake system according to claim 6, wherein the control section continues the power generation by the generator when the wheel braking section starts braking.

8. The hydraulic brake system according to claim 1, wherein the control section executes anti-lock brake control for opening/closing the valve.

9. A bicycle comprising:
the hydraulic brake system according to claim 1.

10. The hydraulic brake system of claim 1, wherein the control section is configured to detect a possible locking of a wheel via a rotational speed sensor.

11. A method for controlling a hydraulic brake system including:
a hydraulic pressure controller including: a base section that is formed with a channel, through which a brake fluid flows and a valve attached to the base section configured to open and close the channel and control fluid pressure of the brake fluid that is supplied to a wheel braking section of a bicycle; and a power supply unit of the hydraulic pressure controller including a generator that generates electric power by traveling of the bicycle and a battery that stores the electric power generated by the generator, the generator being connected between the control section and the battery,
the method for controlling the hydraulic brake system comprising:
governing an opening/closing operation of the valve;
determining an operation state of the braking operation section of the bicycle by a user; and
controlling a power generating operation of the generator in accordance with the operation state;
wherein an amount of electric power provided to the control section and the valve is increased in response to a detection of a locking state of a wheel by providing electrical power to energize a solenoid of the control section (115) via a combination of both the generator and the battery.

* * * * *